2 Sheets—Sheet 1.

I. H. SHAVER & A. RUGER.
CRACKER AND LOZENGE MACHINE.

No. 183,780. Patented Oct. 31, 1876.

Witnesses:
C. N. Woodward
T. H. Parsons

Inventors:
Isaac H. Shaver
Augustus Ruger
By J. R. Drake Atty.

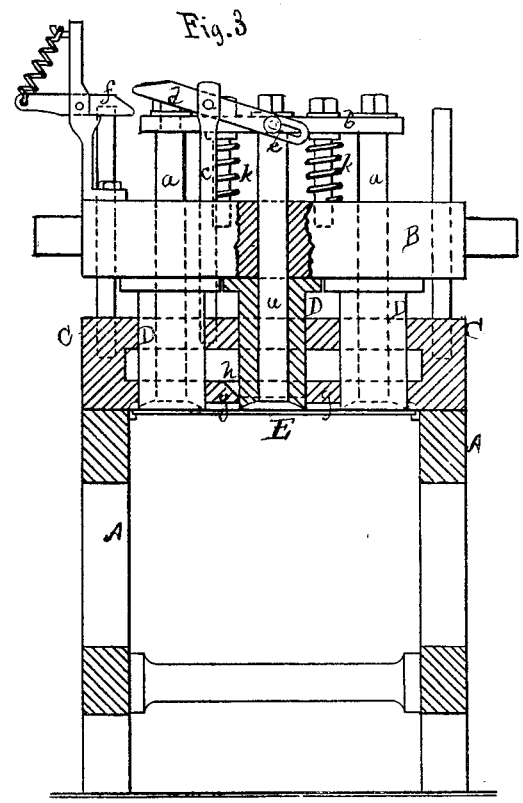

UNITED STATES PATENT OFFICE.

ISAAC H. SHAVER, OF CEDAR RAPIDS, IOWA, AND AUGUSTUS RUGER, OF BUFFALO, NEW YORK.

IMPROVEMENT IN CRACKER AND LOZENGE MACHINES.

Specification forming part of Letters Patent No. 183,780, dated October 31, 1876; application filed April 28, 1876.

*To all whom it may concern:*

Be it known that we, ISAAC H. SHAVER, of Cedar Rapids, in the county of Linn and State of Iowa, and AUGUSTUS RUGER, of Buffalo, in the county of Erie and State of New York, have made certain Improvements in Cracker and Lozenge Machines, of which the following is a specification:

This invention relates to machines for making crackers, cakes, or lozenges; and the invention consists in employing a series of hollow punches to punch out the dough or sugar from the sheet into lozenges, crackers, &c., instead of cutting them out, as is the usual method; it further consists in combining with these hollow punches solid clearers; it further consists in providing a punch-plate, having a series of opening for the punches, and in making the openings countersunk. It finally consists in a sliding plate, which receives and holds the crackers while they are pressed and "docked," and, in sliding, knocks them off onto a pan or apron, which carries them away.

Figure 1:
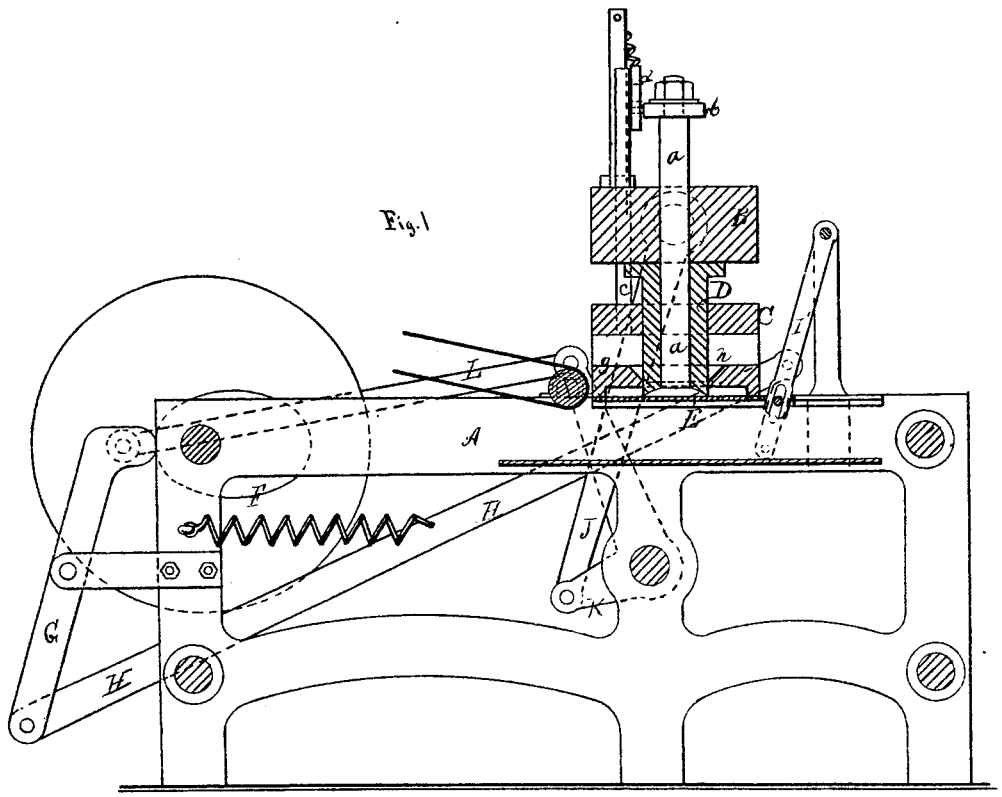
Figure 2:
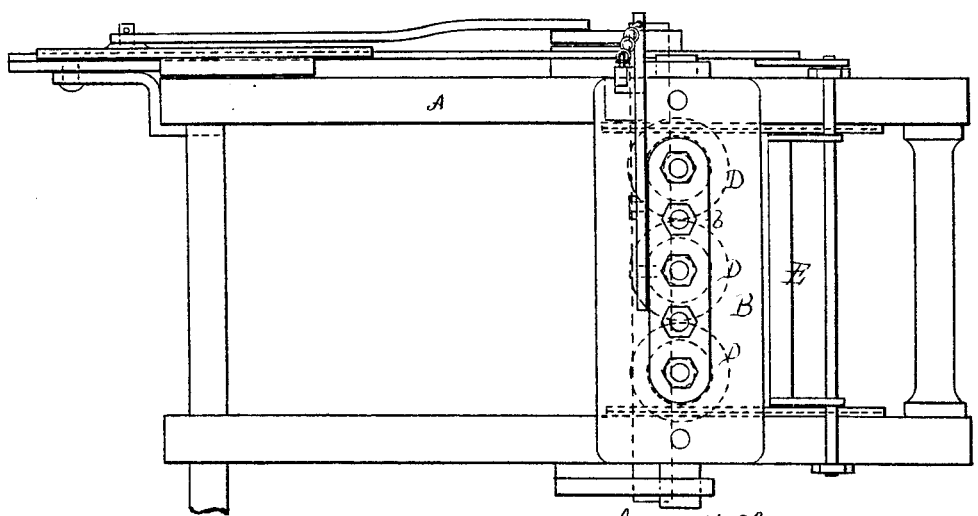

In the drawings, Figure 1 is a sectional side elevation of a portion of a cracker-machine. Fig. 2 is a plan view. Fig. 3 is a sectional end elevation.

A represents the frame, and B the upper or movable portion, and C the stationary part, of the punching-frame. D D are the series of vertical punches, made in any desired form, and having a rod, $a$, acting as a clearer working in each. The punches are secured to the under side of the movable part B, and work down through the stationary section C, in the usual manner. In the lower section C the top of the punch-plate $g$ has openings $h$, through which the punches pass. These are countersunk to allow the dough to press itself and bind it on the edge of the cracker while passing through the punch-plate $g\ h$. This is to form a smooth edge and prevent the cracker splitting when baked, as it is liable to do when pressed through a straight opening. The clearers $a\ a$ run up through the upper section B, and are connected together by a plate, $b$, to which they are secured. $c$ is a standard or stationary post, attached to the lower part C of the frame, and running through the movable part, having an inclined arm, $d$, pivoted thereto, the lower end of which is pivoted by a slot, $e$, to the plate $b$. This arm $d$ is acted upon by a spring trip-pawl, $f$, every time the cutters rise, which serves to force the clearers $a$ down for a sufficient space of time after the cutters begin to rise, and thus push the crackers clear of the cutters. The plate $b$ to which the clearers $a\ a$ are secured is returned to place, when released from the trip $f$, by springs $k\ k$. Beneath the cutter-frame B C is a sliding table, E, which works in suitable slides, and upon which the crackers or lozenges fall. This table is actuated by a cam, F, and levers G, H, and I, by which it is drawn back every time the punches are operated, and thus drops down onto a suitable receptacle the crackers, &c., that have been punched out, and then returns to its place ready for the next lot. The punches are operated by the crank arms J K and connecting-rod L.

The novelty in the invention is in the employment of the punches D and their working through the countersunk punch-plate $g\ h$. The ordinary way of cutting crackers and lozenges is out of a sheet of dough on a flat surface, with cutters, which leaves the scrap and intermediate pieces of dough thereon. By the use of these punches only the crackers, cakes, or lozenges themselves can be carried off and deposited by the slide E. The scrap, &c., is carried off separately by the scrap-apron.

The clearers are very important, as they prevent the cut dough from filling up the punches; without them the punches would clog and would not work.

If desired, points or raised letters can be used on the bottom of these clearers to stamp letters or words or emblems on the crackers, &c. The slide is also important, as it holds the crackers while being pressed, and allows them afterward to drop into a pan or onto an apron, as before stated.

We claim—

1. In a cracker and lozenge machine, the series of punches D D, and operating in connection with the punch-plate $g$, having the punch openings $h$ therein, substantially as and for the purpose specified.

2. In a cracker and lozenge machine, the combination of the series of hollow punches D D and the solid clearers $a\ a$ working therein, substantially in the manner and for the purpose specified.

3. The slide E, operated by suitable devices and in combination with the punches D D and punch-plate $g\ h$, as and for the purpose specified.

4. In a cracker-machine, the combination of the post $c$, slotted arm $d$ pivoted thereto, and also to the plate $b$, the trip-pawl $f$, the clearers $a\ a$, and punches D D, all substantially as and for the purpose specified.

In witness whereof we have hereunto signed our names in the presence of two subscribing witnesses.

I. H. SHAVER.
AUGUSTUS RUGER.

Witnesses:
J. R. DRAKE,
T. H. PARSONS.